US009512959B2

United States Patent
Atkinson (10) Patent No.: US 9,512,959 B2
(45) Date of Patent: *Dec. 6, 2016

(54) MOTOR MOUNT

(71) Applicant: Dyson Technology Limited, Wiltshire (GB)

(72) Inventor: Antoine Francois Atkinson, Swindon (GB)

(73) Assignee: DYSON TECHNOLOGY LIMITED, Wiltshire (GB)

( * ) Notice: Subject to any disclaimer, the term of this patent is extended or adjusted under 35 U.S.C. 154(b) by 100 days.

This patent is subject to a terminal disclaimer.

(21) Appl. No.: 14/331,747

(22) Filed: Jul. 15, 2014

(65) Prior Publication Data

US 2015/0020401 A1  Jan. 22, 2015

(30) Foreign Application Priority Data

Jul. 19, 2013 (GB) .................................. 1312953.1

(51) Int. Cl.
*A45D 20/12* (2006.01)
*F16M 13/02* (2006.01)
(Continued)

(52) U.S. Cl.
CPC .............. *F16M 13/02* (2013.01); *A45D 20/00* (2013.01); *A45D 20/12* (2013.01); *F24H 3/0423* (2013.01); *H02K 5/24* (2013.01)

(58) Field of Classification Search
CPC ......... A45D 20/00; A45D 20/12; F04D 29/00; F04D 29/668; A47L 9/00; A47L 9/22
(Continued)

(56) References Cited

U.S. PATENT DOCUMENTS 3,094,606 A 6/1963 Ferris
4,350,872 A 9/1982 Meywald et al.
(Continued)

FOREIGN PATENT DOCUMENTS

EP 2 000 042 12/2008
EP 2 693 610 2/2014
(Continued)

OTHER PUBLICATIONS

Search Report dated Dec. 5, 2013, directed to GB Application No. 1312953.1; 1 page.
(Continued)

*Primary Examiner* — Stephen M Gravini
(74) *Attorney, Agent, or Firm* — Morrison & Foerster LLP (57) ABSTRACT

A mount for an electric motor, the mount comprising a sleeve for receiving a motor, the sleeve including plurality of elements projecting from a surface of the sleeve and an annular seal extending around the sleeve. The sleeve may have a first end and a second end. The annular seal may be disposed at the first end of the sleeve. A second annular seal may be provided at the second end of the sleeve. The annular seal(s) may be a bellow seal. The plurality of elements may include at least one row of conical elements, axial ribs spaced around the sleeve, compression ribs spaced around the sleeve and/or a lip seal disposed radially around the sleeve. A hair care appliance comprises a casing having a fluid inlet, a fluid outlet and an annular seat, and a motor mount according wherein the motor mount is supported by the annular seat.

33 Claims, 6 Drawing Sheets

(51) Int. Cl.
*A45D 20/00* (2006.01)
*F24H 3/04* (2006.01)
*H02K 5/24* (2006.01)

(58) Field of Classification Search
USPC .......... 34/96, 97, 98; 392/384, 385; 415/119
See application file for complete search history.

(56) References Cited

U.S. PATENT DOCUMENTS

| | | | |
|---|---|---|---|
| 4,767,914 A | | 8/1988 | Glucksman |
| 5,242,281 A | * | 9/1993 | Hartley .................. F04C 9/005 418/53 |
| 5,546,678 A | * | 8/1996 | Dhaemers .............. D06F 58/10 34/224 |
| 5,713,139 A | * | 2/1998 | Briggs .................... D06F 58/04 34/602 |
| 5,784,798 A | * | 7/1998 | Taylor .................... B44D 3/006 285/346 |
| 5,875,562 A | | 3/1999 | Fogarty |
| 5,974,680 A | * | 11/1999 | Anderson ......... H01L 21/67028 134/902 |
| 6,021,993 A | * | 2/2000 | Kirkwood ............... H02K 5/24 248/634 |
| 7,836,607 B2 | * | 11/2010 | Kim ....................... D06F 58/04 165/158 |
| 9,144,286 B2 | * | 9/2015 | Courtney ............... A45D 20/00 |
| 2006/0075654 A1 | | 4/2006 | Lin |
| 2010/0008655 A1 | | 1/2010 | Tackitt et al. |
| 2010/0064542 A1 | | 3/2010 | Mulvaney et al. |
| 2011/0309068 A1 | | 12/2011 | Chen |
| 2014/0328670 A1 | * | 11/2014 | Lamb .................... F04D 29/668 415/119 |
| 2015/0020401 A1 | * | 1/2015 | Atkinson ................ H02K 5/24 34/97 |
| 2015/0021314 A1 | | 1/2015 | Coulton et al. |

FOREIGN PATENT DOCUMENTS

| | | | |
|---|---|---|---|
| FR | 1255721 A | * 3/1961 | ............... A47L 9/22 |
| GB | 953057 | 3/1964 | |
| GB | 2 034 560 | 6/1980 | |
| GB | 2 295 056 | 5/1996 | |
| GB | 2500798 | 10/2013 | |
| GB | 2506654 | 4/2014 | |
| GB | 2513361 | 10/2014 | |
| GB | 2513662 | 11/2014 | |
| GB | 2515812 | 1/2015 | |
| GB | 2516311 | 1/2015 | |
| JP | 40-36100 | 12/1965 | |
| JP | 48-13744 | 4/1973 | |
| JP | 50-152873 | 12/1975 | |
| JP | 54-84507 | 6/1979 | |
| JP | 54-95813 | 7/1979 | |
| JP | 64-83205 | 3/1989 | |
| JP | 2012-45178 | 3/2012 | |

OTHER PUBLICATIONS

International Search Report and Written Opinion mailed Jun. 2, 2015, directed to International Application No. PCT/GB2014/051953; 10 pages.

* cited by examiner

MOTOR MOUNT

REFERENCE TO RELATED APPLICATIONS

This application claims the priority of United Kingdom Application No. 1312953.1, filed Jul. 19, 2013, the entire contents of which are incorporated herein by reference.

FIELD OF THE INVENTION

This invention relates to a mount for a motor, preferably an electric motor.

BACKGROUND OF THE INVENTION

Electric motors are becoming increasingly sophisticated and modern designs are capable of ever higher rotational speeds. One such design of electric motor is a brushless DC motor as used by the applicant in its range of handheld vacuum cleaners and which is capable of being driven at rotational speeds in the region of 100000 rpm.

The use of high speed motors in fluid-moving applications such as vacuum cleaners, fans and hair care appliances is technically attractive since a fan unit equipped with a physically small motor can nonetheless produce very high fluid flow rates.

However, all motors produce vibration as they spin and in such high speed motors it is a particular technical challenge to reduce the noise that is generated by the motor and, therefore, transmitted to its immediate environment. This is particularly the case with brushless DC motors which tend to generate high frequency tones by virtue of the phase excitation necessary in such a motor.

SUMMARY OF THE INVENTION

It is against this background that the invention has been devised.

The invention provides a mount for an electric motor, the mount comprising a sleeve for receiving a motor, wherein the sleeve includes plurality of elements projecting from a surface of the sleeve and an annular seal extending around the sleeve.

Preferably, the sleeve has a first end and a second end. It is preferred that the annular seal is disposed at the first end of the sleeve. Preferably, the annular seal is a bellow seal.

It is preferred that a second annular seal is provided. Preferably, the second annular seal is disposed at the second end of the sleeve. It is preferred that the second annular seal is a bellow seal.

Preferably, the first and second annular seals have a semicircular cross section. It is preferred the first and second annular seals are concave with respect to an inner surface of the sleeve. Alternatively, the first annular seal is concave and the second annular seal is convex with respect to an inner surface of the sleeve.

Each of the plurality of elements and the or each bellow seal is a resilient support for a fan unit housed within the motor mount which is compressible.

Preferably, the plurality of elements includes at least one row of conical elements. It is preferred that the at least one row of conical elements is disposed adjacent an annular seal.

Each of the conical elements defines a single point of contact with a surrounding casing or housing within which the motor is installed, in use. The point-contact engagement or interface the motor mount makes with an installation results in a significant reduction in the acoustic energy and vibrations that are transmitted from the motor through the motor mount.

The elements may take different forms, the important factor being the sharp vertex, point, or tip, the element defines in order to engage a surrounding housing. For example, the elements or 'studs' are preferably conical since conical studs are in practice more straightforward to manufacture accurately. However, the studs could be pyramidal, prismatic or bi-conic for instance.

The size of the studs is a compromise since too narrow a cone may result in buckling, and too broad a cone may result in the vertex being depressed into the body of the cone when it is under load. Therefore, it is currently envisaged that the vertex angle of the studs may be in the range of 40 and 80 degrees, although it is preferred that the vertex angle is about 60 degrees. However, depending on the technical application in which the motor mount is to be used, a wide range of vertex angles may be useful, in the range of 20 to 170 degrees.

Preferably, the plurality of elements includes axial ribs spaced around the sleeve.

It is preferred that the plurality of elements includes compression ribs spaced around the sleeve. Preferably, the compression ribs extend across the annular seal.

It is preferred that the plurality of elements includes a lip seal disposed radially around the sleeve. Preferably, the lip seal is located approximately centrally along the length of the sleeve.

Preferably, the plurality of elements is provided solely on the radially outer surface of the sleeve. Preferably, a radially inner surface of the sleeve is smooth. It is believed that the most benefit is to be obtained from configuring the sleeve so that the elements/studs project only from the outer surface of the sleeve, whilst the inner surface is smooth so as to contact uniformly with the underlying casing of a motor within the sleeve. However, the invention does not exclude features such as mounting lugs, or even point studs being formed either solely on the inner surface of the sleeve, or even in combination with studs on the outer surface of the sleeve.

Alternatively, at least some of the elements are provided on the radially outer surface of the sleeve, and wherein at least some of the elements are provided on a radially inner surface of the sleeve.

Preferably, the sleeve is formed of a polymeric material. Beneficial results are achieved when the motor mount is formed from a polymeric material, and the currently preferred material is polyurethane rubber.

Also disclosed is a hair care appliance comprising: a casing having a fluid inlet, a fluid outlet and an annular seat; a motor mount supported by the annular seat, the motor mount comprising: a sleeve for receiving a motor, the sleeve including plurality of elements projecting from a surface of the sleeve; and an annular seal extending around the sleeve in sealing engagement with the annular seat.

Preferably, the sleeve has a first end and a second end. It is preferred that the annular seal is disposed at the first end of the sleeve. Preferably, the annular seal is a bellow seal.

It is preferred that a second annular seal is provided. Preferably, the second annular seal is disposed at the second end of the sleeve. It is preferred that the second annular seal is a bellow seal.

Preferably, the first and second annular seals have a semicircular cross section. It is preferred the first and second annular seals are concave with respect to an inner surface of the sleeve. Alternatively, the first annular seal is concave and the second annular seal is convex with respect to an inner surface of the sleeve.

Each of the plurality of elements and the or each bellow seal is a resilient support for a fan unit housed within the motor mount which is compressible. The hair care appliance thus comprises both an annular seal and at least one resilient support located between the motor mount and a seat upon which the motor housing is mounted or supported.

Compression of the annular seal between the motor housing and the seat forms an air tight seal which prevents air from leaking back towards the air inlet of the casing along a path extending between the casing and the motor housing and forming a recirculating flow, and so forces the pressurized air flow generated by the impeller to pass to the air outlet of the casing.

The compressive force acting on the annular seal is preferably aligned with the direction of the greatest stiffness of the surface from which the vibrations are to be isolated, that is, the casing of the hair care appliance. In a preferred embodiment, this direction is parallel to the longitudinal axis of the casing. The annular seal is preferably spaced from the inner surface of the casing so that vibrations are not transferred radially outwardly from the annular seal to the casing.

In addition to forming an air-tight seal between the motor mount and the casing, the annular seal can also provide a damping action during use of the fan unit, and so reduce the transmission of the vibrations from the motor mount to the casing through the resilient support(s).

Preferably, the appliance comprises a motor located within the sleeve. In a preferred embodiment, the appliance includes a motor and impeller located within the sleeve. Alternatively, the impeller is located external to the sleeve.

It is preferred that a fluid flow path is provided between the fluid inlet and fluid outlet and through the sleeve. The annular seal of the motor mount seals the fluid flow path with respect to the casing preventing flow recirculating around the motor mount which reduces efficiency.

The casing includes an annular seat which preferably comprises a seal engaging surface, for example a flange, which preferably extends radially inwardly from an inner wall of the casing and generally perpendicular to the inner wall, and which is in sealing engagement with the annular seal.

The casing preferably comprises means for inhibiting angular movement of the motor mount, that is, about the rotational axis of the impeller, relative to the annular seat. The annular seat may be provided with one or more stop members for engaging the annular seal to prevent movement of the annular seal along the seat. The annular seal may be provided with a protrusion for engaging a corresponding depression within the annular seat. The motor mount may also comprise means for inhibiting angular movement of the fan unit relative to the motor mount. For example, the motor mount may comprise one or more stop members for engaging the fan unit to prevent movement of the fan unit along the motor mount.

BRIEF DESCRIPTION OF THE DRAWINGS

The invention will now be described by way of example, with reference to the accompanying drawings, of which:

FIG. 5b is an expanded view of one of the seals shown in FIG. 5a;

DETAILED DESCRIPTION OF THE INVENTION

With reference to FIGS. 1 to 5, a motor mount 10 comprises a generally cylindrical sleeve 12 including first and second open ends 14, 16. The diameter of both the first open end 14 and second open end 16 is substantially the same as the diameter of the sleeve 12.

Figure 1:
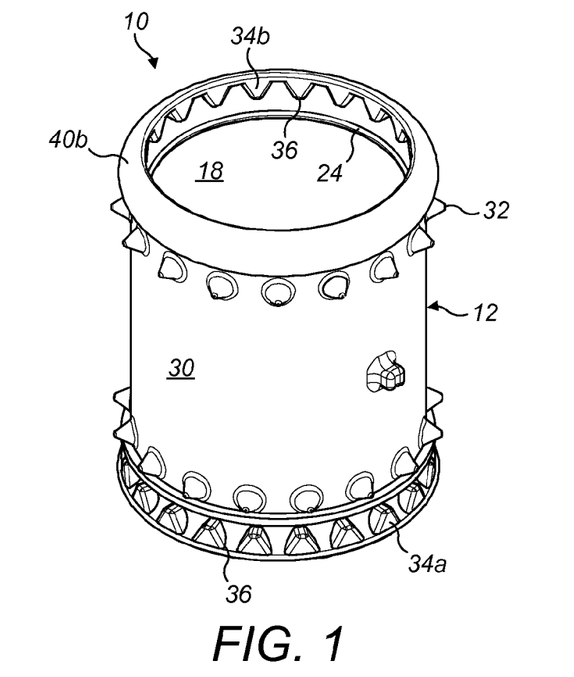
FIG. 1 is an isometric view of a motor mount according to the invention.
Figure 2:
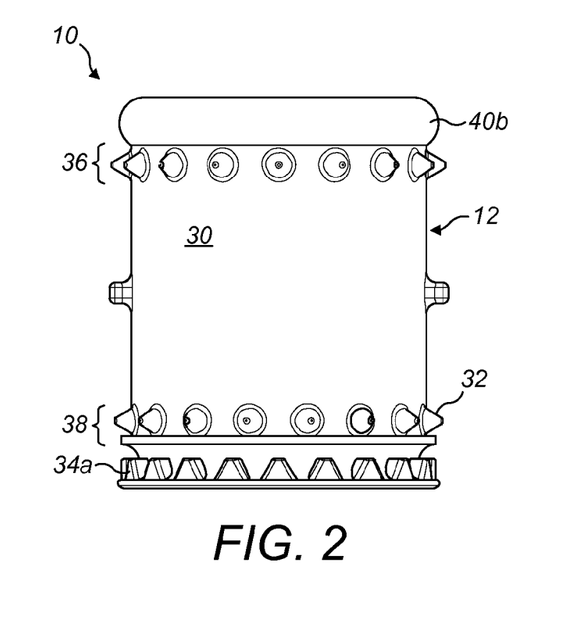
FIG. 2 is a side view of the motor mount shown in FIG. 1.
Figure 3:
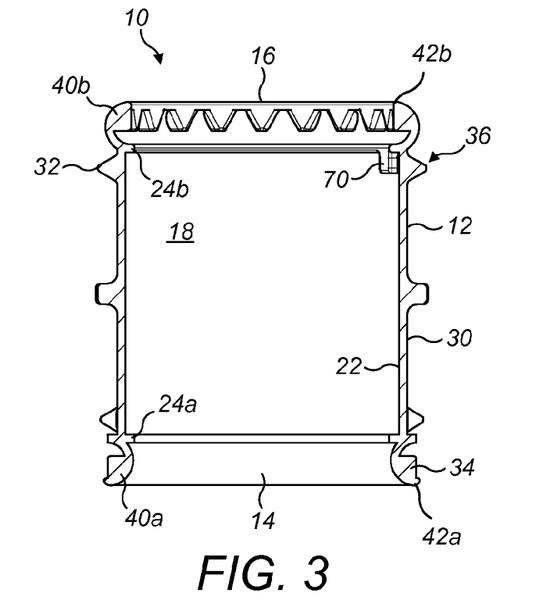
FIG. 3 is a sectional view through the motor mount of FIG. 1.
Figure 4:
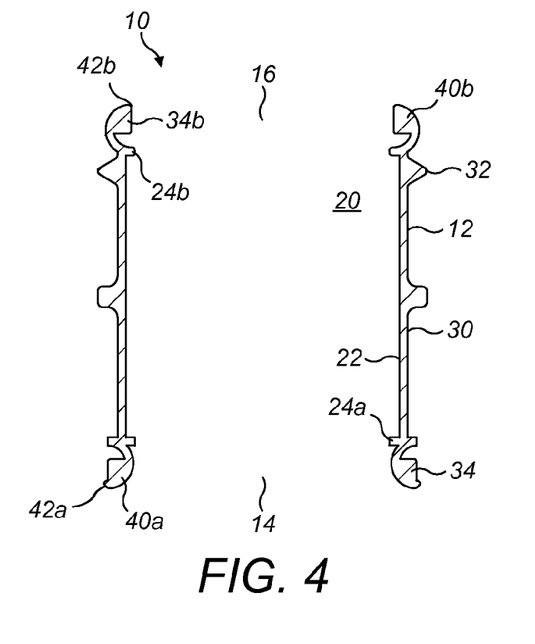
FIG. 4 is a cross sectional view through the motor mount of FIG. 1.

The configuration of the sleeve 12 defines a chamber 18, as shown in FIGS. 3 and 4, into which is received a fan unit comprising an electric motor and impeller 20. The fan unit 20 is received within the chamber 18 through an open end 14, 16 of the sleeve 12. Preferably the sleeve 12 is a flexible material such as a polymer so that the sleeve 12 can be pulled over the external surface of the fan unit 20, and stretched if necessary, so that an inner surface 22 of the sleeve 12 forms a tight fit around the fan unit 20, like a sock. A pair of annular internal flanges 24 extends radially inwards from the inner surface 24 of the sleeve. These flanges 24 define the extent of the chamber 18 and are adapted to retain the fan unit 20 in position with respect to the sleeve 12. Note that the inner surface 22 is smooth in this embodiment so as to conform closely to the cylindrical outer profile of the fan unit 18.

Figure 5A:
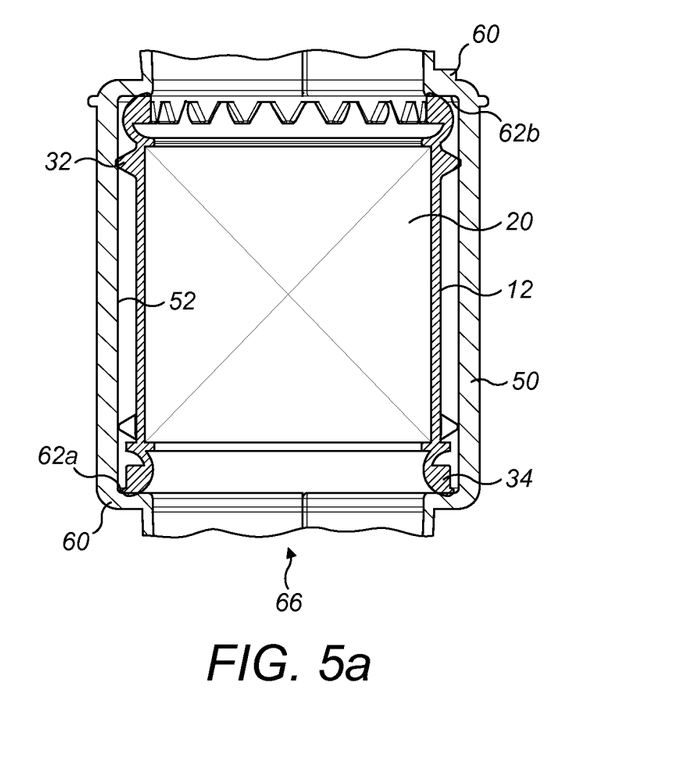
FIG. 5a is a sectional view of the motor mount of FIG. 1 in a casing.
Figure 5B:
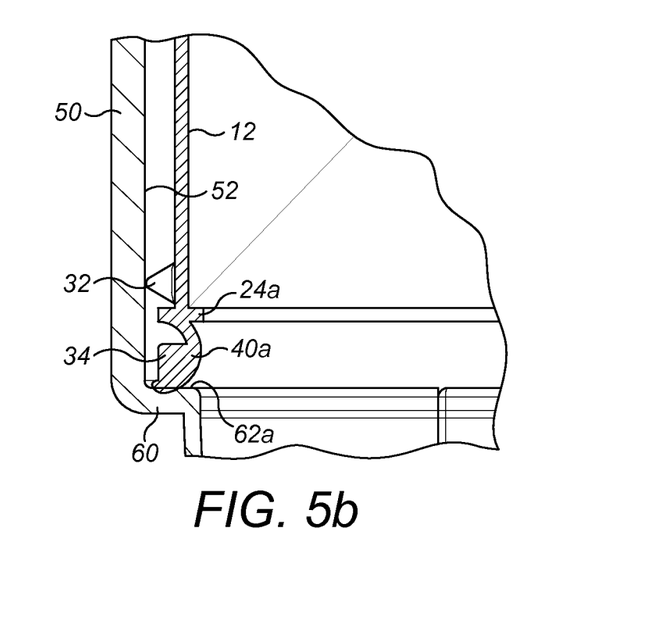

FIGS. 3 and 4 illustrate the interior of the motor mount 10 without its fan unit and FIG. 5 shows a cross section through the motor mount 10 with an electric fan unit shown in situ. It will be appreciated that the electric fan unit 20 is shown schematically for simplicity and so as not to obfuscate the details of the motor mount 10. The fan unit is not central to the inventive concept and so will not be described in detail.

The purpose of the motor mount 10 is to fit around the fan unit 20 and serve as an isolating interface between the external case of the fan unit 20 and an internal surface of an apparatus into which the fan unit is installed. To enhance the isolating characteristics of the motor mount 10, the sleeve 12 is provided with a noise attenuating means. In this embodiment, the noise attenuating means takes the form of a plurality of projecting elements 32, 34 that are spaced around an outer surface 30 of the sleeve wall. Note that only a few of the elements are labelled for clarity.

More specifically, a first type of elements are studs 32 formed as right circular cones, each of which defines a sharp point, also referred to as a vertex 36, as labelled in FIG. 3, that are directed away from the sleeve 12. The studs 32 therefore provide sharp points distributed radially about the surface of the sleeve 12 to serve as an interface with an adjacent housing into which the fan unit and motor mount is installed. FIG. 5 shows the motor mount 10 installed in a casing or housing 50 and it will be seen that the studs 32 engage an inner surface 52 of the housing. The technical principle of the studs 32 is based on minimizing the area of contact that between the fan unit 20 and the housing 50 in order to reduce the transmission of energy from the fan unit 20 to the housing 50. However, at the same time, the studs 32 provide a secure mounting for the fan unit 20 therefore protecting it from shocks that may occur during use, for example, by a user dropping the device in which the fan unit is installed. To this end, there are numerous elements arranged radially about the outer surface 30 of the sleeve 12. In this embodiment, one row 36, 38 is disposed radially around the outer surface 30 of the sleeve 12 at each end of the chamber 18.

In selecting the number of elements for such a fan unit mount, a balance is to be struck between minimizing the number of elements in order to achieve a small area of contact between the mount and an adjacent housing, and providing sufficient elements to support the fan unit so that it is protected from shocks, in use. The studs 32 achieve this by having a low surface area which aids in isolating vibration and noise from the fan unit 20, low stiffness and a conical shape so whilst general vibrations from the fan unit are damped by the low stiffness material, if the product is dropped, the cone shape causes an increase the stiffness of the studs 32 as they are compressed against the inner wall 52 of the casing.

A second type of elements is a plurality of compression ribs 34, these are spaced radially around the outer surface 30 of the sleeve 12 and are located in two rows one between a flange 24a and the first end 14 of the sleeve 12 and the other between a flange 24b and the second end 16 of the sleeve 12. Thus, the compression ribs 34 are located axially external to or outwith the chamber 18 in which the fan unit 20 is located. The compression ribs 34 provide axial cushioning for the fan unit 20. In this embodiment, the compression ribs 34 are generally triangular in shape, with an apex 36 pointing towards the middle of the sleeve 12 axially.

At each end 14, 16 of the motor mount 10, an annular seal 40 is provided. The annular seals 40 are bellow seals 40a, 40b which have a number of functions, one of which is to provide a seal between the casing 50 and the motor mount 10, another is to house the compression ribs 34 and a third is to isolate vibration.

The casing 50 includes a pair of annular seats 60 which each extend radially inwards of the inner wall 52 providing a seal engaging surface or flange 62a, 62b for sealing engagement with respective bellow seals 40a, 40b.

In this embodiment, and the two bellow seals 40a, 40b are orientated oppositely with respect to the sleeve 12. The bellow seals have been orientated oppositely to take advantage of the pressure difference produced between the inner sleeve surface 22 and the outer sleeve surface 30 when the fan unit 20 is activated. The bellow seals 40a, 40b are self energising seals and when the fan unit 20 is activated the respective sealing surface 42a, 42b of each bellow seal 40a, 40b is pushed against the contacting surface 62a, 62b of a flange 60.

The compression ribs 34 are provided with one row 34a on the external surface 30 of the sleeve 12 and the other row 34b on the internal surface 22 of the sleeve 12 this is because the two bellow seals 40a, 40b are orientated oppositely, with one 40a being convex with respect to the inner surface 22 of the sleeve and the other 40b being concave with respect to the inner surface 22 of the sleeve 12.

The bellow seal 40a at the first end 14 of the sleeve 12 and the upstream end of a fluid flow path 66 flowing through the motor mount 10 is concave having the compression ribs 34a on the external 22 surface of the sleeve 12. The bellow seal 40b at the second end 16 of the sleeve is and the downstream end of the motor mount 10 is convex having the compression ribs 34b on the internal surface 22 of the sleeve 12.

The fact that the contacting surface 62a, 62b is a radially disposed surface rather than an axially disposed surface improves vibration isolation. The contacting surfaces 62a, 62b are annular seats located within the main body section 50 formed from flanges 60. On the motor mount 10, flanges 24a, 24b extend radially inwardly from the inner surface 22 of the motor mount 10 so that the contacting surface 62a, 62b of each flange 60 are substantially orthogonal to the rotational axis of the impeller of the fan unit 20. In addition, the rotational axis of the impeller of the fan unit 20 is substantially co-linear with the longitudinal axis of the casing 50.

The bellow seals 34, are annular seals which are preferably smaller than the inner diameter of the casing 50, so that the bellow seal 34 is spaced from the inner surface 52 of the casing 50 and even when compressed, the bellow seal 40a, 40b is isolated from the inner surface 52 of the casing 50.

The bellow seals 34 and the projecting elements 32, 34 provide a plurality of resilient supports between the motor mount 20 and the inner surface 52 of the casing 50. The resilient supports are provided radially about the motor mount 10 and at or adjacent each end 14, 16 of the motor mount providing axial and radial cushioning for the motor regardless of orientation. This is an important benefit of this type of motor mount as for appliances which are designed to be held and do not have a base surface onto which it is placed when not being held the fan unit required protection from shocks in all orientations is case of dropping the appliance or knocking it off a surface.

Figure 6:
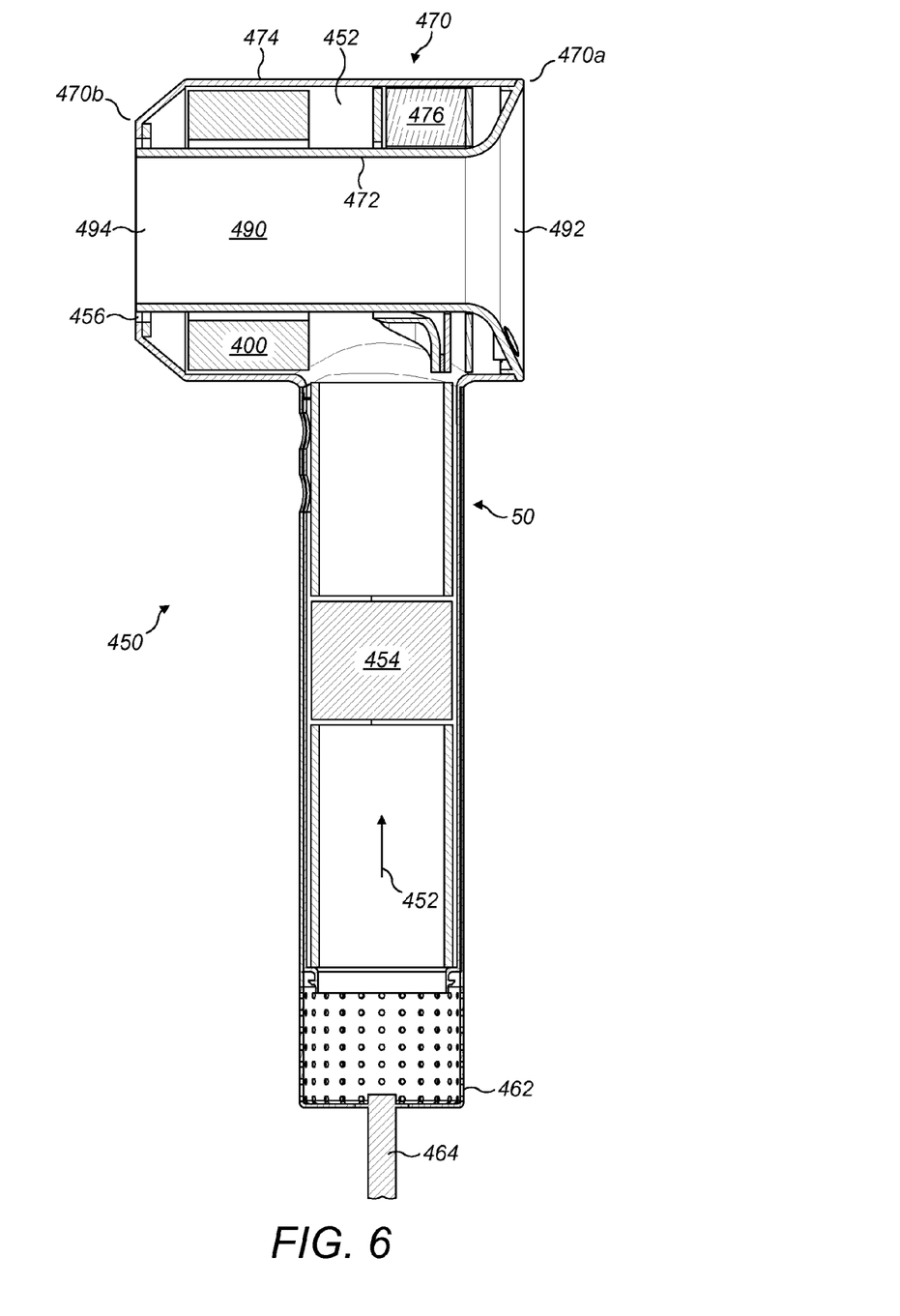
FIG. 6 is a sectional view of a motor mount within an appliance.
Figure 7:
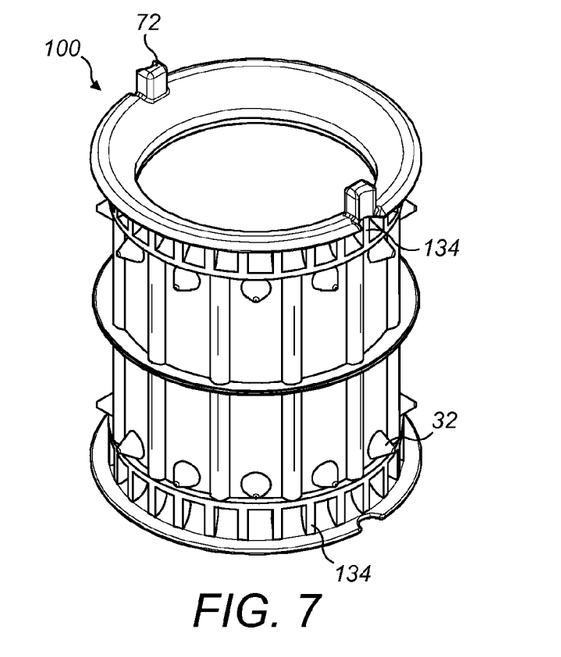
FIG. 7 is an isometric view of an alternate motor mount according to the invention.
Figure 8:
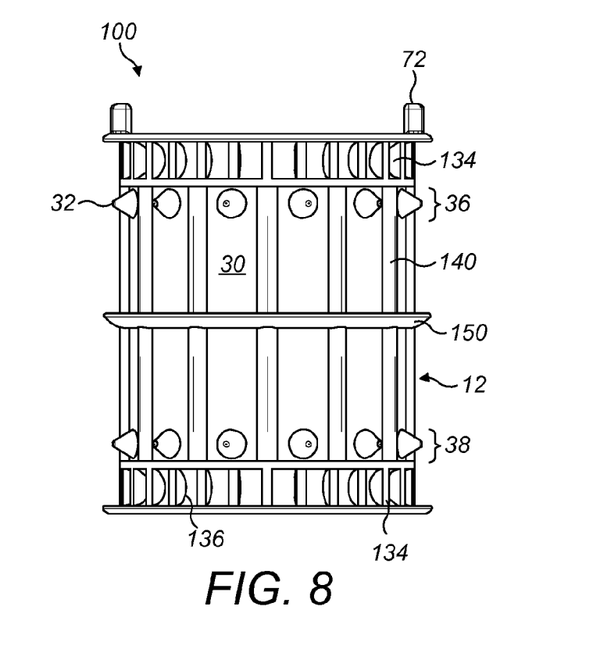
FIG. 8 is a side view of the motor mount shown in FIG. 7.
Figure 9:
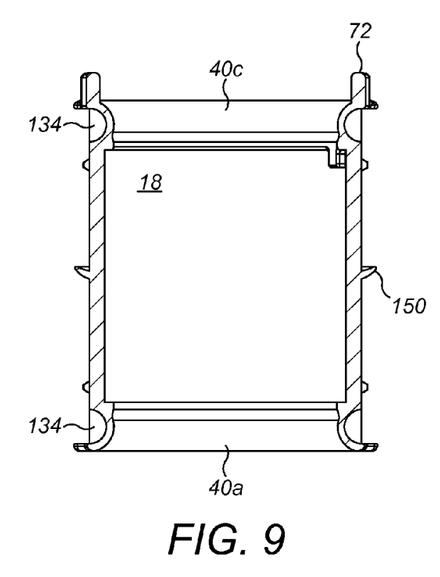
FIG. 9 is a sectional view through the motor mount of FIG. 7.
Figure 10:
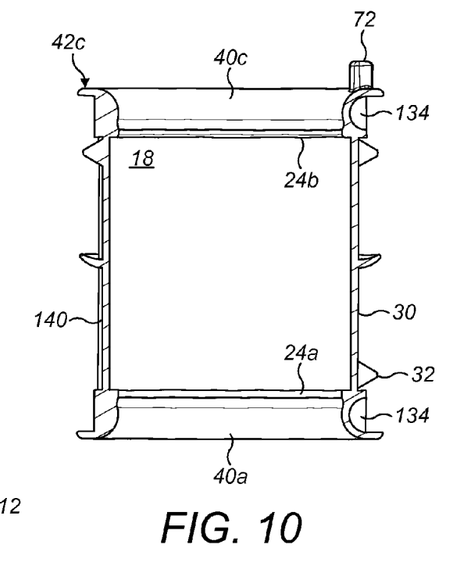
FIG. 10 is a different sectional view through the motor mount of FIG. 7.
Figure 11:
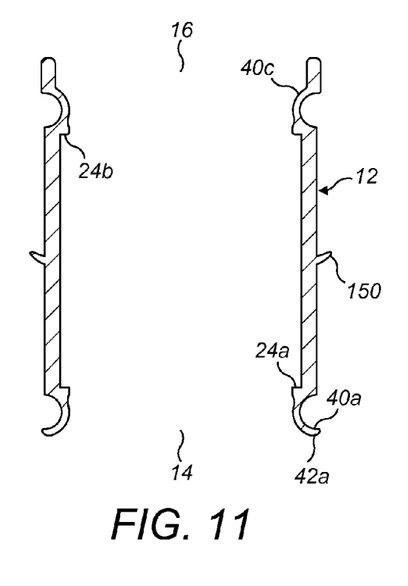
FIG. 11 is a cross sectional view through the motor mount of FIG. 7.

FIG. 6 shows across section through a hairdryer 450 which incorporates a motor mount. The motor mount with fan unit 454 are shown as a single unit in situ. It will be appreciated that the motor mount with fan unit 454 are shown schematically for simplicity and so as not to obfuscate the details of the hairdryer 450.

The hairdryer 450 is an amplifying hairdryer where processed flow 452 or that which is drawn into the appliance by the action of a motor mount with fan unit 454 and optionally heated is augmented or increased by an entrained flow.

The hairdryer 450 has a handle 50 and a body 470. An inlet 462 is provided in the handle 50 at the distal end from the body 470. Fluid is drawn into the inlet 462 by the action of a motor mount with fan unit 454 and flows within a fluid flow path 452 along the handle 50 from the inlet 462 towards the body 470. The fluid flow path 452 within the handle is generally circular but, within the body it becomes annular.

The body 470 is tubular and has an internal duct 472 which extends along the length of the body 470 from an inlet end 470a to an outlet end 470b. This duct 472 defines the entrained fluid flow path 490 which flows within the duct 472 from a second inlet 492 to a second outlet 494. The duct 472 and an outer wall 474 of the body 470 define the fluid flow path 452 through the body from the handle 50 towards a fluid outlet 456 of the fluid flow path 452. Within the body 470, a heater 400 is disposed and the heater extends along and around the duct 472 and directly heats fluid flowing in the fluid flow path 452. Fluid flowing through the entrained flow path 490 may be indirectly heated by the heater 400.

In operation, the motor mount with fan unit 454 draws fluid in through the inlet 462 along the fluid flow path 452 to the body, through the heater 400 and to the fluid outlet 456. The action of this fluid flowing through the hairdryer and out of the fluid outlet 456 causes fluid to be entrained or pulled into the duct 472 at the second inlet 492 and along the entrained fluid flow path 490 towards the second outlet 494.

In this example the processed flow exits from the hairdryer as an annular ring that extends around the entrained flow. Thus the output from the hairdryer is a heated ring of fluid surrounded on both sides by cooler air. As an alternative, the fluid outlet 456 is located within the body 470 and the heated fluid mixes with the entrained flow before the fluid exits from the appliance.

Power is supplied to the hairdryer via a cable 464 which enters the hairdryer 450 at the inlet 462. Internal wiring (not shown) provides power to the heater 400 and the motor mount with fan unit 454 to run a motor that drives the impeller of the fan unit 454.

In order to provide a variety of temperature and flow rates through the appliance, a PCB 476 is provided. The PCB 476 is electrically connected to both the heater 400 and the fan unit 454 and enables a user to vary power to both. As an example, the user can chose different power and heat settings. The PCB 476 controls the power to each heater layer 100, 400 independently so for low temperature settings, only one heater needs to be used. In addition, the speed of the fan unit 454 can be varied to change the flow through the appliance.

The rotation of the impeller of the fan unit by the motor generates vibrations which are transferred through the motor mount 10 towards the casing or handle 50. Depending on the appliance orientation, at least one of the annular seals 40a, 40b located between the motor mount 10 and the casing is compressed under the weight of the motor housing and the fan unit 454, so that it is in sealing engagement with the seal engaging surface or flange 62a, 62b. The annular seals 40a, 40b thus not only prevent the primary air flow from travelling along a path extending between the inner surface 52 of the casing 50 and the outer surface 30 of the motor mount 10, but also reduces the transmission of these vibrations to the flange 62a, 62b and thus to the casing or handle 50 of the hairdryer 450. The presence of the plurality of elements 34, 36 between the motor mount 10 and the casing 50 inhibits the transmission of vibrations through sleeve 12 of the motor mount 10 to the inner wall 52 of the casing. The flexibility of the plurality of elements 34, 36 allows them to flex both axially and radially relative to the casing 50, which reduces the transmission of vibrations from the fan unit.

Another motor mount will now be described in relation to FIGS. 7 to 11. Features that are in common with the embodiment previously described use the same reference numbers. The motor mount 100 includes a different arrangement of projecting elements 32, 134, 140, 150 which both isolate the fan unit 20 from a casing 50 and support the fan unit 50 with respect to flanges 24a, 24b and the inner surface 52 of the casing 50 within which the motor mount 100 is designed to be received.

The first type of projecting elements 32 are essentially the same as have been previously described and are disposed at each end of the chamber 18 as before.

In this embodiment, the bellow seals 40a, 40c are both orientated with respect to the sleeve in the same manner. Both the upstream and downstream bellow 40a and 40c respectively are concave and the compression ribs 134 are provided on the external surface 30 of the sleeve 12. For the downstream compression rib 40c, the sealing surface is 42c and this is pushed against the contacting surface 62b of the flange 60 of the casing 50 when the fan unit 20 is activated within the casing 50

The second type of projecting elements 134 are a compression ribs which has a semicircular profile having their rounded sides 136 in contact with an outer surface of the bellow seal 40a, 40c in which they are located.

A third type of projecting element is a series of axial ribs 140 that extend around the external surface 30 of the sleeve 12. These axial ribs 140 reinforce the structure of the motor mount 100 particularly in the event of a shock to the appliance produced, for example, by dropping the appliance.

A fourth type of projecting element is a lip seal 150 which extends around the sleeve 12. Although the lip seal contacts the housing over a relatively large area, the lip seal is intended only to create a seal between the compressor and the housing and is not intended to absorb radial vibration of the compressor. Consequently, the lip seal may be configured such that the seal provides a relatively poor transmission path for radial vibration of the compressor. In particular, the radial compliance of the seal may be greater than that of the studs or ribs. Consequently, radial vibration of the compressor relative to the housing is opposed by the studs or ribs rather than the lip seal.

In this example, the lip seal 150 is located approximately centrally along the length of the sleeve 12, however the lip seal may be disposed anywhere along the length of the sleeve 12 so long as it does not interfere with the functioning of the studs 32, compression ribs 134 and bellow seals 40a, 40c.

As has been mentioned above, it is preferred that the motor mount is a polymeric material. In this embodiment, polyurethane rubber is used.

The motor mount 10, 100 may include anti-rotation elements to prevent rotation of the motor and/or motor mount within the casing.

Referring now to FIG. 3, the motor mount 10 includes a projecting feature 70 which projects from an internal flange 24b of the motor mount 10. The projecting feature 70 projects into the chamber 18 into which a motor or fan unit is disposed and is adapted to engage with a corresponding feature on the motor/fan unit to prevent relative rotation thereof.

Referring to FIGS. 7 to 10, the motor mount 100 includes a pair of projecting features 72 which project upwards from the upstream bellow seal 40c of the motor mount 100. The pair of projecting features 72 project outwards from the motor mount 100 and are adapted to engage with a pair of corresponding features located within the upstream flange or seal engaging surface 62b to prevent relative rotation of the motor mount 100 within the casing 50.

Some variations to the specific embodiment of the illustrative drawings have already been mentioned above. Others will now be explained below.

In the specific embodiment shown the fan unit 20 is equipped with a motor and an impeller to act as a fluid mover, the air flow being depict by way of arrows and both the motor and impeller are housed within the motor mount. Such an arrangement may have particular application to devices which require high speed air flows, such as vacuum cleaners, hair care appliances such as hairdryers and hot styling brushes, and fans. However, it should be appreciated that the specific embodiment is only exemplary and that the motor mount may house just the motor with the impeller being located externally thereof hence the use of the term motor mount 10 as the mount is applicable to any apparatus in which a motor needs to be installed in a close conforming housing, whether or not the motor is coupled to an impeller.

The cylindrical shape of the sleeve is currently preferred since it functions to envelope the correspondingly shaped outer surface of the motor in an unbroken 'sock' of protecting and isolating material. However, it is also envisaged that benefits would be achieved if the sleeve were part cylindrical so that it does not envelope the entire outer surface of the motor.

Although the outer surface of the motor mount is provided with a plurality of pointed studs, in this embodiment, the inner surface of the motor mount is smooth. Reference to the smoothness of the internal surface of the sleeve is not intended as a precise value of surface roughness, rather that the inner surface should be substantially free from surface aberrations/bumps and projections, so that the inner surface makes uniform contact with the outer periphery of the external case of the motor. Without being bound by theory, it is believed that the smoothness of the inner surface of the sleeve promotes good acoustic contact between the motor and the sleeve.

In the specific embodiment described above the sleeve is cylindrical. However, it should be appreciated that this is not essential to the invention and the sleeve may instead have a different cross sectional profile. Here, the profile is cylindrical so as to match the cylindrical profile of the motor casing since the sleeve should conform to its outer surface. It follows, therefore that the sleeve may have whatever profile is required to mate with an outer casing of a motor, although cylindrical motor casings are most common.

The annular seal described in the specific embodiments is a bellow seal however any arrangement which is capable of both sealing an annulus and is reversibly compressible is applicable as will be apparent to the skilled person.

The invention claimed is:

1. A mount for an electric motor, the mount comprising a sleeve including a chamber for housing a motor, the sleeve including a plurality of elements projecting from a surface of the sleeve and an annular seal extending around the surface of the sleeve wherein the electric motor is driven at rotational speeds in the region of 100000 rpm.

2. The mount of claim 1, wherein the sleeve has a first end and a second end.

3. The mount of claim 2, wherein the annular seal is disposed at the first end of the sleeve.

4. The mount of claim 1, wherein the annular seal is a bellow seal.

5. The mount of claim 2, comprising a second annular seal.

6. The mount of claim 5, wherein the second annular seal is disposed at the second end of the sleeve.

7. The mount of claim 5, wherein the second annular seal is a bellow seal.

8. The mount of claim 7, wherein the first and second annular seals have a semicircular cross section.

9. The mount of claim 8, wherein the first and second annular seals are concave with respect to an inner surface of the sleeve.

10. The mount of claim 8, wherein the first annular seal is concave and the second annular seal is convex with respect to an inner surface of the sleeve.

11. The mount of claim 1, wherein the plurality of elements includes at least one row of conical elements.

12. The mount of claim 11, wherein the at least one row of conical elements is disposed adjacent an annular seal.

13. The mount of claim 1, wherein the plurality of elements includes axial ribs spaced around the sleeve.

14. The mount of claim 1, wherein the plurality of elements includes compression ribs spaced around the sleeve.

15. The mount of claim 14, wherein the compression ribs extend across the annular seal.

16. The mount of claim 1, wherein the plurality of elements includes a lip seal disposed radially around the sleeve.

17. The mount of claim 16, wherein the lip seal is located approximately centrally along the length of the sleeve.

18. The mount of claim 1, wherein the plurality of elements is provided solely on the radially outer surface of the sleeve.

19. The mount of claim 18, wherein a radially inner surface of the sleeve is smooth.

20. The mount of claim 1, wherein at least some of the elements are provided on the radially outer surface of the sleeve, and wherein at least some of the elements are provided on a radially inner surface of the sleeve.

21. The mount of claim 1, wherein the sleeve is formed of a polymeric material.

22. A hair care appliance comprising:
a casing having a fluid inlet, a fluid outlet and an annular seat; and
a motor mount comprising a sleeve including a chamber for housing a motor, the sleeve including a plurality of elements projecting from a surface of the sleeve and an annular seal extending around the surface of the sleeve wherein the electric motor is driven at rotational speeds in the region of 100000 rpm, wherein the motor mount is supported by the annular seat.

23. A hair care appliance comprising:
a casing having a fluid inlet, a fluid outlet and an annular seat;
a motor mount supported by the annular seat, the motor mount comprising: a sleeve including a chamber for housing a motor, the sleeve including plurality of elements projecting from a surface of the sleeve; and
an annular seal extending around the surface of the sleeve in sealing engagement with the annular seat.

24. The appliance of claim 23, comprising a motor located within the sleeve.

25. The appliance of claim 23, comprising a fluid flow path between the fluid inlet and fluid outlet and through the sleeve.

26. The appliance of claim 23, wherein the annular seat comprises a seal engaging surface for sealing engagement with the annular seal.

27. The appliance of claim 26, wherein the seal engaging surface is a flange.

28. The appliance of claim 26, wherein the seal engaging surface extends radially of and is generally perpendicular to an inner wall of the casing.

29. The appliance of claim 23, wherein the casing is configured to inhibit angular movement of the motor mount relative to the annular seat.

30. The appliance of claim 29, wherein the motor mount comprises a protrusion for engagement with a corresponding depression within the annular seat.

31. The appliance of claim 23, wherein the motor mount is configured to inhibit angular movement of the fan unit relative to the motor mount.

32. The appliance of claim 31, wherein the motor mount comprises one or more stop members for engaging the fan unit to prevent movement of the fan unit along the motor mount.

33. A mount for an electric motor, the mount comprising a sleeve including a chamber for housing a motor, the sleeve including plurality of elements projecting from a surface of the sleeve and an annular seal extending around the surface of the sleeve wherein the electric motor is included in a hand held appliance.

\* \* \* \* \*